United States Patent [19]

Eberhart et al.

[11] 4,189,827

[45] Feb. 26, 1980

[54] TREATMENT OF ELECTROCHEMICAL CELL COMPONENTS WITH LITHIUM TETRACHLOROALUMINATE (LIALCL4) TO PROMOTE ELECTROLYTE WETTING

[75] Inventors: James G. Eberhart, Naperville; James E. Battles, Oak Forest, both of Ill.

[73] Assignee: The United States of America as represented by the United States Department of Energy, Washington, D.C.

[21] Appl. No.: 957,619

[22] Filed: Nov. 3, 1978

[51] Int. Cl.$^2$ ............................ B05D 5/12; H01M 6/36
[52] U.S. Cl. ............................ 29/623.1; 427/190; 427/193; 427/126; 429/112; 429/250; 429/52
[58] Field of Search ............................ 429/112, 250, 52; 427/126, 190, 193; 29/623.1

[56] References Cited

U.S. PATENT DOCUMENTS

| | | | |
|---|---|---|---|
| 3,404,041 | 10/1968 | Inami | 429/112 |
| 3,751,298 | 8/1973 | Senderoff | 429/112 |

Primary Examiner—Ronald H. Smith
Assistant Examiner—Richard Bueker
Attorney, Agent, or Firm—R. V. Lupo; Frank H. Jackson; Hugh W. Glenn

[57] ABSTRACT

Electrochemical cell components such as interelectrode separators, retaining screens and current collectors are contacted with lithium tetrachloroaluminate prior to contact with molten electrolytic salt to improve electrolyte wetting. The LiAlCl$_4$ can be applied in powdered, molten or solution form but, since this material has a lower melting point than the electrolytic salt used in high-temperature cells, the powdered LiAlCl$_4$ forms a molten flux prior to contact by the molten electrolyte when both materials are initially provided in solid form. Components of materials such as boron nitride and other materials which are difficult to wet with molten salts are advantageously treated by this process.

9 Claims, No Drawings

TREATMENT OF ELECTROCHEMICAL CELL COMPONENTS WITH LITHIUM TETRACHLOROALUMINATE (LIALCL4) TO PROMOTE ELECTROLYTE WETTING

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to methods of assembling high-temperature electrochemical cells and is particularly directed to the problem of wetting cell components with molten salt electrolytes. Molten salt compositions including the alkali metal halides and alkaline earth metal halides do not readily wet various ceramic and metallic materials that are employed in various electrochemical cell components. Components such as interelectrode separators, particle retainers and current collectors are of particular concern.

The molten salt electrolyte is the medium for ionic conduction between electrodes and thus it must permeate into and wet the surfaces of the various materials within and between the electrodes. Particular problems in this regard have arisen with the various ceramic materials such as boron nitride, aluminum nitride, silicon nitride, zirconium dioxide, magnesium oxide, yttria and calcium zirconate. Separators are formed by fabricating these materials into woven fabrics, cloths, screens, felts, and compacts of fibrous and particulate materials. Materials such as boron nitride have been extremely difficult to wet with electrolytes that are mixtures of alkali metal chlorides such as LiCl-KCl.

Metallic components such as retaining screens and current collector structures include for instance, molybdenum, stainless steel, iron, iron-base alloys, nickel and nickel-base alloys. These materials, particularly when fabricated with abrupt sharp edges within their pores or mesh, are not readily wet with molten salt electrolytes.

Various prior methods for enhancing the wetting of components by molten electrolyte have included prewetting of individual components prior to cell assembly, filling electrolyte into assembled cells under vacuum conditions to draw the electrolyte into contact with porous and mesh members, cleaning and sand-blasting components to insure against surface impurities and an initial break-in exposure of the various components to molten salt within the cell structure. Although some of these methods have encountered some limited success, they are cumbersome and complicate the procedures for electrochemical cell initiation.

PRIOR ART STATEMENT

U.S. Pat. No. 4,057,678 to Walker, Nov. 8, 1977, illustrates a high-temperature electrochemical cell and discusses separator preparation techniques along with various materials employed in interelectrode separators. The problems of wetting the separator and other cell components with the molten electrolytic salt are not addressed.

U.S. Pat. No. 3,915,742 to Battles et al., Oct. 28, 1975. This patent shows another cell configuration and the use of boron nitride as an interelectrode separator material.

U.S. Pat. No. 3,933,520 to Gay et al., Jan. 20, 1976 illustrates high-temperature electrochemical cells and various components of different materials that require wetting by the high-temperature molten salt electrolyte.

None of these prior art references disclose or suggest the novel method for improving the wettability of cell components by the molten salt electrolyte, as is now described in the present invention.

SUMMARY OF THE INVENTION

Therefore, in view of the difficulties relating to electrolyte wetting in high-temperature electrochemical cells, it is an object of the present invention to provide an improved method for treating cell components to enhance their wettability by molten salt electrolytes.

It is a further object to provide a method of improving the wettability of ceramic and refractory material separators employed in high-temperature electrochemical cells with molten salts containing alkali metal chlorides as electrolyte.

It is a further object to provide a method of improving the wettability of metallic cell components having pores or mesh with sharp acute angles that have proven to be difficult to permeate and wet with molten salt electrolytes.

In accordance with the present invention, a method is provided of improving the wettability of electrochemical cell components with molten salt electrolytes by contacting the component with lithium tetrachloroaluminate ($LiAlCl_4$) prior to contact with the molten electrolytic salt. An interelectrode separator or particle retaining screen can be conveniently dusted or otherwise treated with powdered, molten or dissolved lithium tetrachloroaluminate and assembled into an electrochemical cell prior to filling of the cell with molten, alkali-metal chloride electrolytic salt.

In the more particular aspects of the invention, $LiAlCl_4$ powder is applied onto the component surfaces and this powder is subsequently heated to its melting point to spread over the surface as a flux for enhancing the wettability on subsequent contact with molten electrolytic salt. The $LiAlCl_4$ can be melted onto the component surface prior to cell assembly or melted during the heating of the assembled cell for electrolyte filling. The electrolyte salts most particularly contemplated are those containing alkali metal chlorides in mixtures that have melting points in excess of the melting point of $LiAlCl_4$.

DETAILED DESCRIPTION OF THE PREFERRED EMBODIMENT

Electrochemical cells such as those described in the patents cited above in the Prior Art Statement typically illustrate high-temperature cells that employ alkali metal halide salts in molten state as electrolyte. The method of the present invention for improving the wettability of various cell components has application for use with such electrochemical cells.

The cells contemplated include positive electrodes with transition metal sulfides such as $FeS_2$, $FeS$, $CoS_2$, $CoS$, $NiS_2$, $NiS$ and $Cu_2S$. The active material can be contained within a positive electrode structure as compacted or loosely distributed particles within porous cellular or reticular current collectors of metal or carbon. Often particulate current collector materials such as carbon or metal particles along with particulate electrolytic salt are blended with the active material in forming the positive electrode structure. These techniques are well known and are described in the above-cited patents along with a large number of other patents and references.

Negative electrodes for such cells include alkali or alkaline earth metals such as lithium, sodium or calcium, often in alloy form such as lithium-aluminum or calcium-aluminum alloys to retain them in solid state. Particulate active material can be formed into an integral electrode structure much in the same way as the positive electrode material. Also alloy structures of for instance lithium-aluminum as wire, mesh, screen or compacts can be employed. One method of preparing lithium-aluminum electrodes is illustrated in U.S. Pat. No. 3,957,532 to Settle, Myles and Battles.

The electrodes are separated by electrically insulative, interelectrode separators such as felts, cloths, fabrics or powders of ceramic or refractory materials, for example boron nitride, yttria, aluminum nitride, silicon nitride and magnesium oxide. It is essential that these interelectrode separators be permeated and wet by the molten salt electrolyte to permit ionic conduction between the electrodes for operation of the cell. Poor wetting of the separator increases the internal cell resistance and leads to impaired cell performance.

Other components that may be disposed between the electrodes include spacers and particle retainers of screens, mesh, cloths, fabrics or porous plates of carbon or metals such as molybdenum, stainless steel, iron, iron-base alloys, nickel, nickel-base alloys and other suitable metals. In addition, the active material and current collectors of the electrodes also must be wetted by the electrolyte to enhance ionic flow within the cell and accordingly can be treated in accordance with the present method.

Various alkali metal halides are currently used as components of the molten salt electrolyte mixtures within cells of this type. One of the most common electrolytes to which the particular method of this invention is well adapted is the eutectic of LiCl-KCl. This salt melts at about 352° C. which is substantially above the 150° C. melting point of $LiAlCl_4$. Other electrolytes to which the method of this invention may apply include LiCl-LiBr, LiF-LiI, LiCl-LiI, NaCl-NaI, LiF-LiCl-LiBr, LiF-LiCl-LiI, LiF-LiCl-KCl and various other known electrolytic salt combinations that can be made molten at practical cell operating temperatures of about 250°-600° C.

In one manner of carrying out the present invention, the component to be wetted by the molten electrolyte is dusted with fine particles of $LiAlCl_4$. The particles adhere to the surface of the component which is then heated to above 150° C. to melt and spread a flux of molten $LiAlCl_4$ over the surface. It is preferred that the $LiAlCl_4$ be melted only a short time before the component is contacted with molten electrolyte. Alternatively the powdered component can be assembled within the electrochemical cell such that the $LiAlCl_4$ melts as the cell is raised to operating temperature. Although not preferred, $LiAlCl_4$ can be applied to a component by immersing it briefly in molten $LiAlCl_4$ and permitting it to drain after removal. This latter technique normally applies more $LiAlCl_4$ flux than is needed to improve wettability.

Only very small amounts of $LiAlCl_4$ need be added to the cell component to enhance its wettability by the molten electrolyte. Amounts as little as about 7 mg per $cm^2$ of component area have been sufficient with a boron nitride felt separator. It is expected that between about 5 to 200 mg/$cm^2$ surface is a sufficient application of $LiAlCl_4$ for most cell components. Applications within this range have been seen to reduce the contact angle of LiCl-KCl molten salt with boron nitride fabric from about 140° (nonwetting) to near zero contact angle at which the fabric is completely wetted by the electrolyte.

The following examples are presented to illustrate the method of the present invention.

EXAMPLE I

Cell SC-27

Two boron nitride felts of about 10 cm$\times$7 cm$\times$1.6 mm were dusted with about 1 gram of $LiAlCl_4$ on each of the four major surfaces. The $LiAlCl_4$ was applied with a dry brush to obtain a near uniform distribution. The felt was heated to about 160° C. to melt and spread the $LiAlCl_4$ through the porous structure. After cooling the felt had the yellow green color of $LiAlCl_4$ and was still flexible enough for easy handling. The separators were assembled into a cell with an FeS positive electrode, LiAl negative electrodes and LiCl-KCl electrolyte. The cell was operated for 72 cycles over 48 days with about 97% coulombic efficiency during the first 65 cycles. The cell was operated at charge and discharge current densities of 20-120 mA/$cm^2$.

EXAMPLE II

A particle retainer having photoetched openings of about 100 to 300 $\mu$m in a stainless steel sheet was obtained commercially. On exposure to molten LiCl-KCl electrolyte at 400° C., it was found that the electrolyte did not penetrate and wet the retainer openings. A similar retainer was immersed in molten $LiAlCl_4$ at 200° C., removed and drained before exposure to molten LiCl-KCl electrolyte salt. After this $LiAlCl_4$ pretreatment the retainer was readily wet with molten electrolyte.

EXAMPLE III

A carbon cloth was dusted with powdered $LiAlCl_4$ and then immersed in molten LiCl-KCl at 425° C. It was found that the electrolyte completely wet the carbon cloth which could be used as an electrode wrapper and particle retainer within a high temperature electrochemical cell.

It will be seen from the above that the present invention provides an improved method for enhancing the wettability of components used in high-temperature electrochemical cells having molten salt electrolytes. The increased molten salt wettability lowers the cell internal resistance and eliminates the need for preconditioning the cell by long exposure of the components to molten electrolyte. The previous vacuum filling methods used to ensure permeation of electrolyte through the separator and other components between the electrodes are thus made unnecessary which simplifies cell assembly procedures. This method is particularly well suited for cells employing hard to wet ceramic materials such as boron nitride or metal retainers that have sharp angles between surfaces and openings.

It will be clear that although the present invention is described in terms of specific embodiments, various modification in materials, procedures and implementation will occur to those skilled in the art within the scope of the invention as defined in the following claims.

The embodiments of the invention in which an exclusive property or privilege is claimed are defined as follows:

1. A method of improving the wettability of electrochemical cell components with molten electrolyte consisting essentially of alkali metal halides in a mixture having a melting point in excess of the melting point of $LiAlCl_4$, comprising:

contacting said component with $LiAlCl_4$; and subsequently contacting said component with said molten electrolyte.

2. The method of claim 1 wherein powdered $LiAlCl_4$ is applied onto a surface of said component, said component with powdered $LiAlCl_4$ is assembled into an electrochemical cell containing solid alkali metal halides and heat is applied to first melt said $LiAlCl_4$ and subsequently melt said alkali metal halides.

3. The method of claim 1 wherein said electrolyte is a mixture of alkali metal chlorides and has a melting point between 250° and 600° C.

4. The method of claim 1 wherein said molten electrolyte comprises a mixture of alkali metal halides selected from the group consisting of LiCl-KCl, LiCl-LiBr, LiF-LiI, LiCl-LiI, NaCl-NaI, LiF-LiCl-LiBr, LiF-LiCl-LiI, and LiF-LiCl-KCl.

5. The method of claim 1 wherein said component is an interelectrode separator.

6. The method of claim 1 wherein said component is composed of a metallic or ceramic material.

7. The method of claim 6 wherein said metallic or ceramic material is selected from the group consisting of boron nitride, yttria, aluminum nitride, silicon nitride, carbon, magnesium oxide, molybdenum, molybdenum-base alloys, stainless steel, iron, iron-base alloys, nickel and nickel-base alloys.

8. The method of claim 1 wherein said component is an interelectrode separator comprising boron nitride.

9. A method of improving the wettability of electrochemical cell components with molten electrolyte comprising:

applying $LiAlCl_4$ powder onto a surface of said component; and subsequently melting said $LiAlCl_4$ to spread as a flux over said component surface prior to contacting said surface with molten electrolyte.

* * * * *